United States Patent
Agrawal

(10) Patent No.: US 8,301,478 B2
(45) Date of Patent: Oct. 30, 2012

(54) SYSTEM AND METHOD FOR A HOUSEHOLD SERVICES MARKETPLACE

(75) Inventor: Bal Agrawal, Chappaqua, NY (US)

(73) Assignee: Lifeworx, Inc., Chappaqua, NY (US)

( * ) Notice: Subject to any disclaimer, the term of this patent is extended or adjusted under 35 U.S.C. 154(b) by 1848 days.

(21) Appl. No.: 11/240,268

(22) Filed: Sep. 29, 2005

(65) Prior Publication Data

US 2007/0106547 A1    May 10, 2007

(51) Int. Cl.
*G06Q 10/00* (2012.01)

(52) U.S. Cl. ...................................................... 705/7.14

(58) Field of Classification Search .................... None
See application file for complete search history.

(56) References Cited

U.S. PATENT DOCUMENTS

| | | | |
|---|---|---|---|
| 5,117,353 A * | 5/1992 | Stipanovich et al. | 705/11 |
| 5,164,897 A * | 11/1992 | Clark et al. | 705/321 |
| 5,884,270 A * | 3/1999 | Walker et al. | 705/321 |
| 6,275,812 B1 * | 8/2001 | Haq et al. | 705/7.14 |
| 6,385,620 B1 * | 5/2002 | Kurzius et al. | 1/1 |
| 6,408,337 B1 * | 6/2002 | Dietz et al. | 709/229 |
| 6,742,002 B2 * | 5/2004 | Arrowood | 707/104.1 |
| 7,043,443 B1 * | 5/2006 | Firestone | 705/7.14 |
| 7,117,162 B1 * | 10/2006 | Seal et al. | 705/9 |
| 7,424,438 B2 * | 9/2008 | Vianello | 705/9 |
| 2001/0049674 A1 * | 12/2001 | Talib et al. | 707/1 |
| 2002/0072946 A1 * | 6/2002 | Richardson | 705/8 |
| 2002/0091669 A1 * | 7/2002 | Puram et al. | 707/1 |
| 2002/0133369 A1 * | 9/2002 | Johnson | 705/1 |
| 2002/0152316 A1 * | 10/2002 | Dietz et al. | 709/229 |
| 2003/0009437 A1 * | 1/2003 | Seiler et al. | 707/1 |
| 2003/0033292 A1 * | 2/2003 | Meisel et al. | 707/3 |
| 2003/0061089 A1 * | 3/2003 | Weaver | 705/9 |
| 2003/0182171 A1 * | 9/2003 | Vianello | 705/9 |
| 2003/0187680 A1 * | 10/2003 | Fujino et al. | 705/1 |
| 2005/0010467 A1 * | 1/2005 | Dietz et al. | 705/9 |
| 2005/0228709 A1 * | 10/2005 | Segal | 705/9 |
| 2005/0267794 A1 * | 12/2005 | Forte | 705/9 |
| 2006/0047530 A1 * | 3/2006 | So et al. | 705/1 |
| 2006/0047551 A1 * | 3/2006 | Cotten et al. | 705/8 |
| 2006/0229896 A1 * | 10/2006 | Rosen et al. | 705/1 |
| 2006/0229902 A1 * | 10/2006 | McGovern et al. | 705/1 |
| 2006/0235884 A1 * | 10/2006 | Pfenninger et al. | 707/104.1 |
| 2006/0265267 A1 * | 11/2006 | Chen et al. | 705/9 |
| 2006/0265270 A1 * | 11/2006 | Hyder et al. | 705/9 |
| 2008/0027747 A1 * | 1/2008 | McGovern et al. | 705/1 |
| 2008/0183488 A1 * | 7/2008 | Vianello | 705/1 |
| 2008/0183585 A1 * | 7/2008 | Vianello | 705/14 |

* cited by examiner

*Primary Examiner* — Romain Jeanty
*Assistant Examiner* — Brett Feeney
(74) *Attorney, Agent, or Firm* — Orrick Herrington & Sutcliffe, LLP

(57) ABSTRACT

A system and method are disclosed for the operation of an In-home Assistant Service. The service provides a marketplace to connect households with assistants for frequent and specialized jobs. The service collects profile data of potential assistants including multiple skills the assistant can provide. It also enables the household to provide detailed request criteria. A locate process is then performed to determine, which assistants best meet the identified criteria.

31 Claims, 8 Drawing Sheets

SYSTEM AND METHOD FOR A HOUSEHOLD SERVICES MARKETPLACE

FIELD

The present invention is directed generally to apparatuses, methods, and systems for a household services marketplace, and more particularly, to an apparatus, method and system for requesting household services and identifying personnel to fulfill the requests.

BACKGROUND

In order to balance a family's increasingly limited free time with necessary chores and responsibilities many people need frequent and specialized outside help in their households. Typically, a household might require assistance with duties, such as, cooking, cleaning, pet care, babysitting, shopping, errands, eldercare, lawn and garden maintenance or handyman duties. For many households, however, the need for such services is often not large enough to require regular full-time help. Thus, when such a need arises, members of the household are faced with the difficult problem of both locating and scheduling competent individuals to perform the required service.

The problems faced by households requiring part-time work are mirrored by personnel seeking to provide these services. The irregular needs of household clientele make it difficult for a service provider to connect with individuals requiring these part-time and specific services. Moreover, there exists a group of individuals, such as people with regular full or part-time jobs, that would be willing to perform these services if they could fit them within their schedule, but for whom the logistical issues raised in establishing clients make performing this type of extra work impractical.

SUMMARY

This disclosure details the implementation of apparatuses, methods, and systems for an In-home Assistant Service. The In-home Assistant Service enables household clientele to connect with appropriate service personnel and arrange for work to be performed. The disclosed systems and methods allow for fine-grained criteria to be considered in matching clientele and service providers. Certain embodiments of the disclosed systems and methods further provide electronic confirmation and booking of service requests, thereby enabling productive and efficient fulfillment of work requests.

A method is disclosed for providing households with service assistants. The method includes collecting information about many assistants, which would include, for example, the assistant's job skills and their level of ability for each skill. This information is stored for each of the assistants. A job request is received from a household, which includes a number of job details. The job request is divided into essential and secondary criteria. Potential assistants are screened to determine which assistants meet the essential criteria. The assistants meeting the essential criteria are then searched based on the secondary criteria to find an assistant to fill the job. The job can then be automatically booked and confirmed. After the service is completed the household is billed and they are offered the opportunity to rate the quality of the service provided.

A system is disclosed in which an In-house Assistant Service connects households with assistants. The service collects information from assistants describing details about their skills, locations and availability. This information is stored. Households can submit detailed job requests. Criteria from the job requests are used to search the collected assistant information and determine a match for the job request. The search process involves separating the job criteria in to essential and secondary criteria. Once limited to assistants meeting the essential criteria, the secondary criteria are used to narrow the assistant search.

BRIEF DESCRIPTION OF THE DRAWINGS

The accompanying drawings illustrate various non-limiting, example, inventive aspects in accordance with the present disclosure.

DETAILED DESCRIPTION

Figure 1:
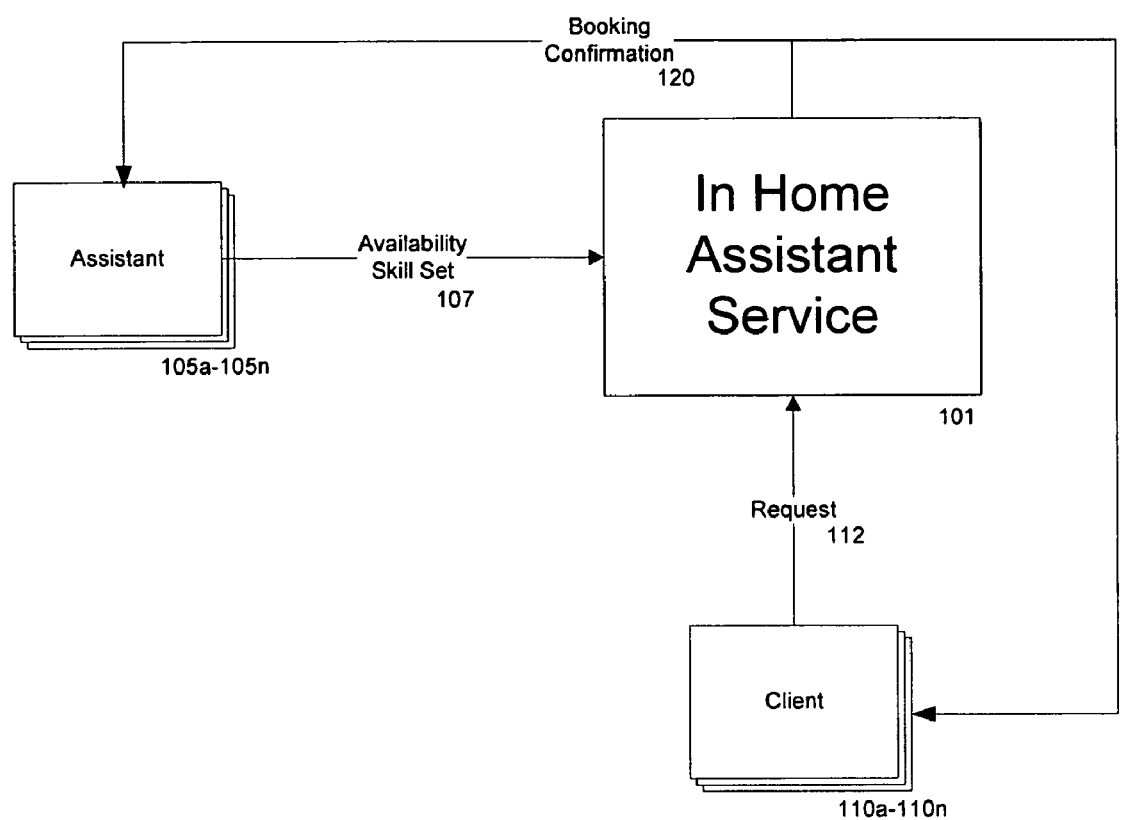
FIG. 1 illustrates inventive aspects of a simplified example of an In-home Assistant Service in a data flow diagram.

FIG. 1 illustrates aspects of a simplified example of an In-home Assistant Service. An In-home Assistant Service provider 101 provides the core infrastructure for the operation and maintenance of the system. Specifically, the In-home Assistant Service provider 101 provides the interface for both assistants 105a-105n to connect and establish their work availability and households 110a-110n to connect and establish their assistance needs.

An exemplary scenario might begin with a particular assistant 105a contacting the In-home Assistant Service 101 to communicate details about the assistant's skill set and availability 107. The assistant, for example, might be a stay-at-home mother who is an excellent chef. When first contacting the In-home Assistant Service, she would provide a detailed disclosure of her capabilities and availability. If her circumstances change, for example her child goes to camp in summer, she can communicate with the In-home Assistant Service to identify her new availability. The In-home Assistant Service, 101 stores the information provided by assistant 105a, along with comparable information supplied by other assistants.

Continuing with the exemplary scenario, a particular household 110a contacts the In-home Assistant Service 101 to communicate their requirements for assistance 112. The household's primary care giver, Mom for example, might be starting her own business. Upon receipt of the request from household 105a, the In-home Assistant Service provider 101 algorithmically searches its stored records for assistants matching the criteria contained in the household's request. Upon finding a match the In-home Assistant Service provider 101 communicates a booking confirmation 120 to the matched assistant and household. To fully service the needs of potential clientele, it would be advantageous to employ a database of at least 20 assistants.

Figure 2:
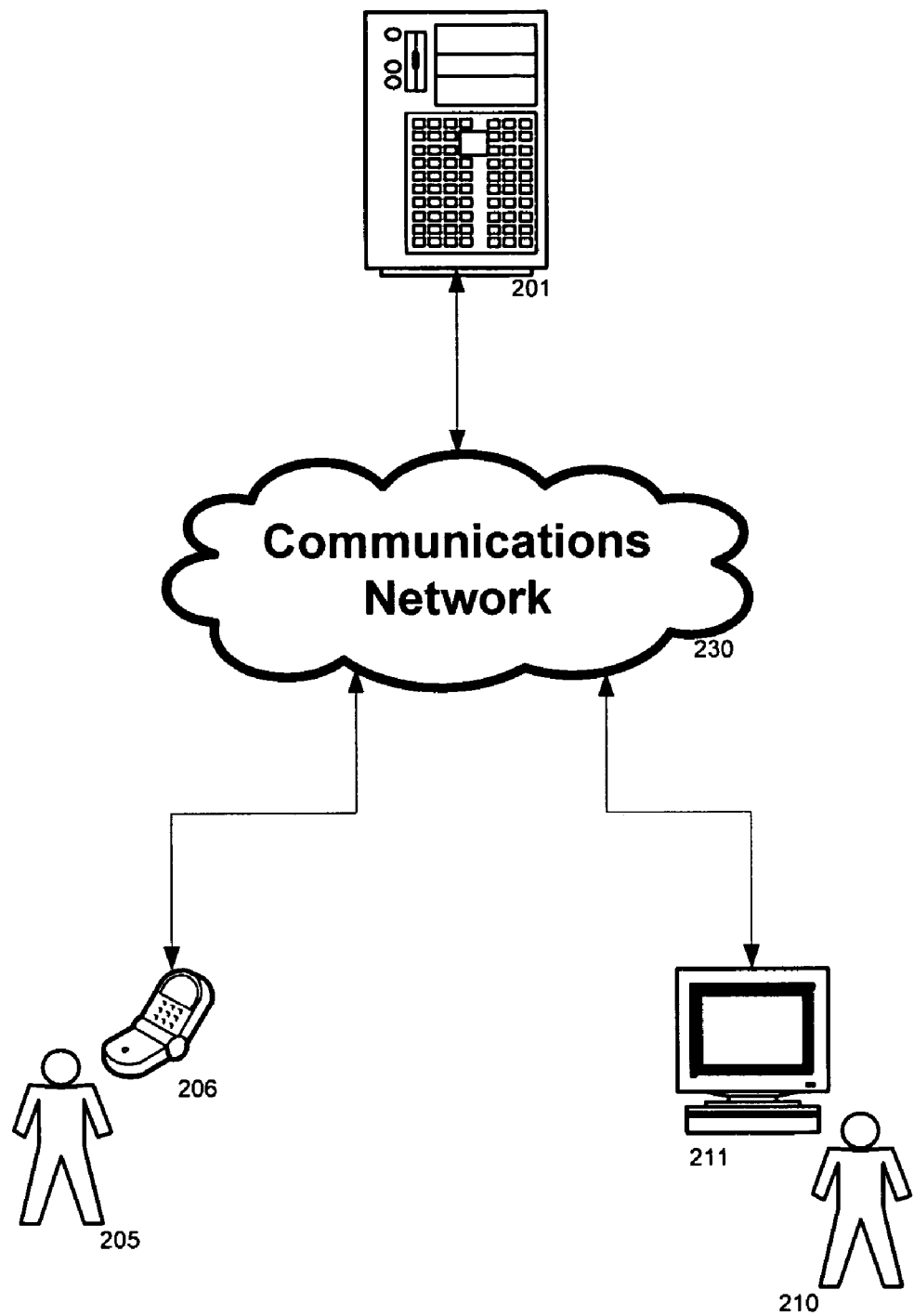
FIG. 2 illustrates inventive aspects of an In-home Assistant Service in a data flow diagram.

FIG. 2 illustrates an advantageous exemplary embodiment of an In-home Assistant Service in a data flow diagram. The In-home Assistant Service provider is embodied by an In-home Assistant Service server 201 connected to a communications network 230, e.g., the internet. The server 201 can be embodied by one or more computer systems as know in the art and would be capable of conducting data communications over the network. The server 201 would also contain software to enable user devices to connect and interact with it, e.g., a web server.

An assistant 205 uses an assistant networked device 206 to connect over the communications network 230 and interact with the server 201. A particularly advantageous embodiment of the assistant networked device 206 would be a mobile network device with software to connect to and communicate with the server 201, e.g., a web browser. For example, the server 201 can provide a web server that the assistant networked device 206 can connect to. The assistant 205 could view web pages provided by server 201 and use them as a mechanism to provide skill and availability information via the networked device 206 to the server 201.

A member of household 210 uses a networked device 211 to connect over the communications network 230 and interact with the server 201. A particularly advantageous embodiment of the networked device 211 would be a personal computer with software to connect to and communicate with the server 201, e.g., a web browser. For example, the server 201 can provide a web server that the client networked device 211 can connect to. The household 210 could view web pages provided by server 201 and use them as a mechanism to submit requests for assistance via networked device 211 to the server 201.

Figure 3:
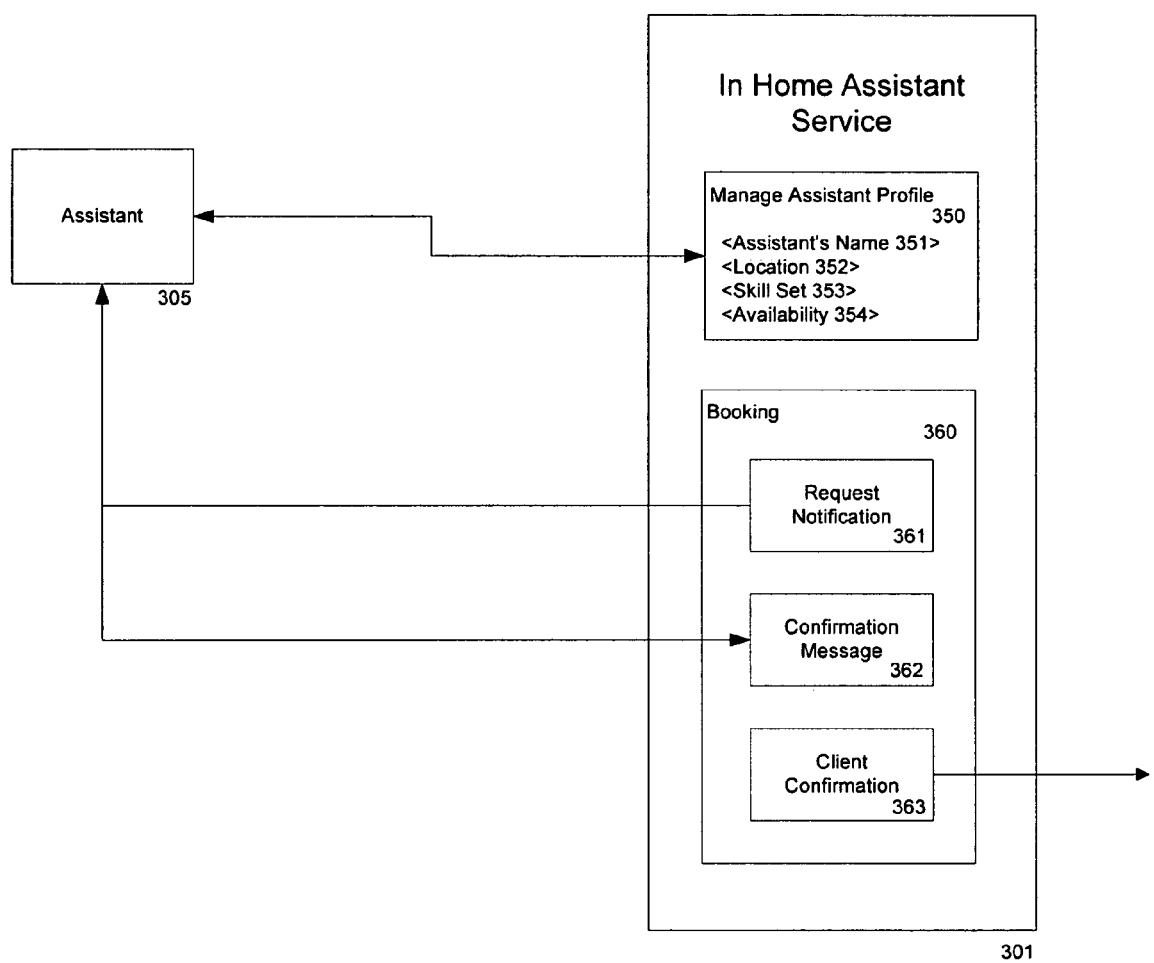
FIG. 3 illustrates inventive aspects of assistant service in a data flow diagram.

FIG. 3 illustrates a data flow diagram detailing exemplary interactions between an assistant and the In-home Assistant Service. The assistant 305 communicates with the In-home Assistant Service 301 for a variety of transactions.

One transaction that the assistant will undertake with the In-home Assistant Service is manage assistant profile 350. In this mode, assistants can provide and edit the information about themselves required by the In-home Assistant Service. This can be accomplished, for example, through a web page or a series of web pages. Assistants would perform a manage assistant profile 350 communication whenever they need to change their profile data, such as when they develop a new skill or must adjust their availability schedule. In the alternative, people at the In-home Assistant Service can interview the assistants to attain and enter the profile data. This interview process can also include background and references checks. The background check can be conducted by personnel of the In-home Assistant Service or could merely be ordered by the In-home Assistant Service. The In-home Assistant Service could also include a feature where an assistant is not made available for jobs until receipt and review of the background check is confirmed. The reference checks can include quality determinations that are used to determine the assistant's skill level.

The In-house Assistant Service can collect data, such as, the assistant's name 351, location 352, skill set 353 and scheduled availability 354. With regard to the assistant's location 352, the system might optionally also collect information regarding the distance the assistant is willing to travel for a job. As an alternative, the travel distance field could be eliminated by using the assistant's billing rate could be to determine the distance. The assumption being that higher paid workers are willing to travel farther for a job. In a typical suburban area, a 25 mile travel distance has been found to be advantageous. With regard to the assistant's skill set 353, it would be particularly advantageous to allow the assistant to identify multiple skills, e.g., SK1, SK2 . . . SKn. In one embodiment, system will be able to record at least three skills for each assistant. Moreover, for each identified skill it would be also be particularly advantageous to allow the assistant to identify further details about the skill, such as, their proficiency, specialties, and billing rates for the work.

For certain fields, such as skill or proficiency, the In-house Assistant Service 301 would most likely have a selection of predefined choices. Predefined choices would enable more efficient searches because the system would be assured that each assistant would be using the same categorization system. For example, the system might provide a pre-defined list of skills and the level of proficiency might be on a scale of 1 to 10. In contrast, other fields like "specialty" might be open ended to allow assistants to articulate their unique individual capabilities.

Although the various database tables will be described in greater detail in FIG. 6, an XML example of a assistant profile data structure follows:

```
<assistant>
    <name>Erin Smith</name>
    <location>Springfield</location>
    <skill>Chef
        <proficiency>8</proficiency>
        <specialties>Italian</specialties>
        <rate>25.00</rate>
    </skill>
    <skill>Homemaking
        <proficiency>5</proficiency>
        <specialties>Errands</specialties>
        <rate>14.00</rate>
    <skill>
    <skill>Pet Care
        <proficiency>7<proficiency>
        <specialties>Pet Sit</specialties>
        <rate>14.00</rate>
    </skill>
    <availability>
        02202006(13:00–22:30),
        0212006(14:00–00:00),...
        12052006(08:15–23:00)
    </availability>
</assistant>
```

In this example, the assistant Erin Smith lives in Springfield and is willing to perform chef services at of $25.00/hour, homemaking services for $14.00/hour, or Pet Care services for $14.00/hour. Her assessed skills in these fields are, on a scale of 1 to 10, 8, 5 and 7, respectively. As a chef, she specializes in Italian cooking and as a Homemaker she is best at running errands. Her availability is identified in a comma delimited date and time code. As noted above these entries would have been populated in response to the assistant's interaction with the user interface presented during the manage profile 350 transaction.

Another transaction between the assistant and the In-home Assistant Service is the booking procedure 360. This transaction takes place after the In-home Assistant Service has identified a particular assistant as suitable for a particular job. The transaction begins with the In-home Assistant Service 301 sending a booking request notification 361 to the assistant 305. The booking request 361 could be advantageously transmitted over any number of communications channels, such as, an instant message, an SMS message, an email, a phone call, a pager message or a fax. In response, the assistant 305 can then send a confirmation message 362 back to the In-home Home Assistant Service 301, which could travel over the same communications channel as the booking request 361 or it could be sent over a different communications channel. One advantageous approach would be to provide the booking request through a system that allows a link to be included in the request that when selected sends the confirmation message. Once the assistant's confirmation is received, a client confirmation is sent to the household 363.

The booking procedure 360 could be embodied by any number of additional systems. For example, the confirmation message 362 could be eliminated and the assistant could be assumed to have confirmed by virtue of the particular time being listed as available in his profile. Alternately, the booking request message 362 could be sent to multiple assistants, with the first to respond receiving the job. In another embodiment, a bidding system could be implemented in which multiple assistants receiving the job requests can bid on the job with the lowest bid receiving the work. The system would require an additional message to go out to whichever of the assistants received the booking.

Figure 4:
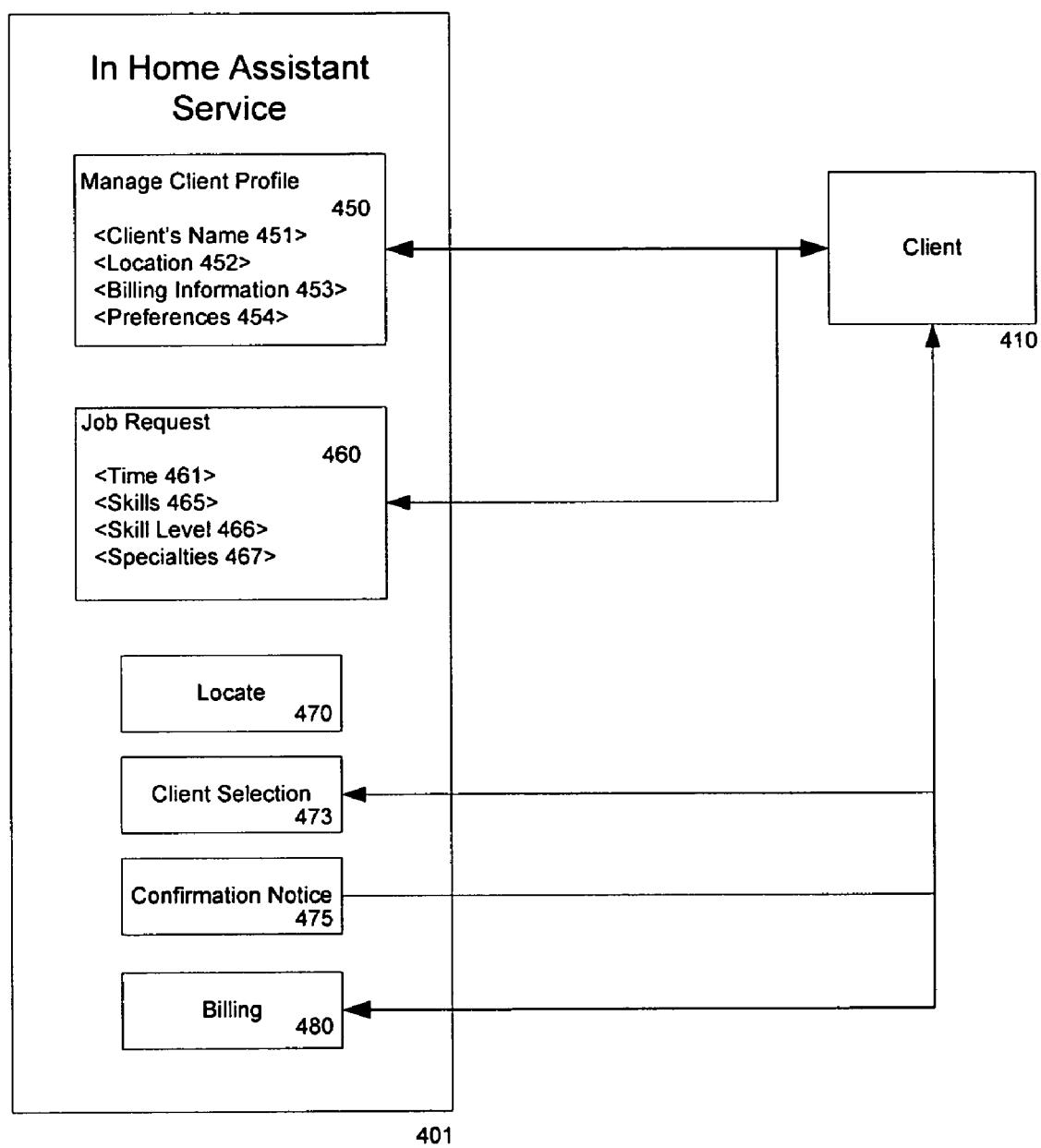
FIG. 4 illustrates inventive aspects of household request in a data flow diagram.

FIG. 4 illustrates a data flow diagram detailing exemplary interactions between a household and the In-home Assistant Service. The household 410 communicates with the In-home Assistant Service 401 for a variety of transactions.

The household 410 will provide account information in a manage household profile transaction 450. In this transaction the household can provide the information about itself required by the In-home Assistant Service 401. Like the assistant information, the household information can be advantageously provided through interaction with one or more web pages. The household profile information could include, name 451, location 452, billing information 453 and preferences 454. The preferences 453 could include any type of information that might be relevant to the household's particular needs, such as, specific assistants the household prefers or particular ways in which jobs should be performed.

The household 410 will also interact with the In-home Assistant Service 401 in a job request transaction 460. The job request transaction 460 is initiated by the household 410, who provides the time or a range of time of the job 461, the skills required 465, some details of work to be done 466 and specialties requested 467.

This request data, along with relevant data from the household's profile 460, is algorithmically processed by the In-home Assistant Service by performing a locate process 470, which identifies available assistants. An exemplary implementation of this process is discussed in detail with regard to FIGS. 5A, 5B and 5C, below.

With potential assistants identified by the locate process 470, the transaction could continue in at least one of two ways. The list of potential assistants can be used to notify all the assistants as discussed above as an alternative to the booking request disclosed with regard to FIG. 3. In the alternative, the list of potential assistants can be provided to the household in a selection process 473 where the household is provided with profile information about each of the available assistants is allowed to choose the one who is offered job, for example the user might choose based on the specialties, skill level or rate of the offered assistants. This secondary screening process might also be passed to a person at the In-house Assistant Service rather than the client. Once the potential assistants are narrowed down by this process, their information will be passed to the booking request disclosed with regard to FIG. 3.

Upon confirmation of an assistant who will take the job, the household is sent a confirmation notification 475. This confirmation can be via any communications channel, not necessarily the same channel used to place the request. The confirmation might also include a confirmation that the In-home Assistant Service has confirmed performance of a background check of the assistant.

The client 410 might also engage in billing processes 480 with the In-home Assistant Service 401. The billing process could include the household reporting that the work was done. Alternatively, the billing process might include contacting the assistant to gather a report of the time worked and jobs done.

The household might also be provided with a means for rating the performance of the Assistant. This information could then be used to adjust the Assistant's skill level. For example, the skill levels reported by the households could be averaged to arrive at a composite skill ranking.

Figure 5A:
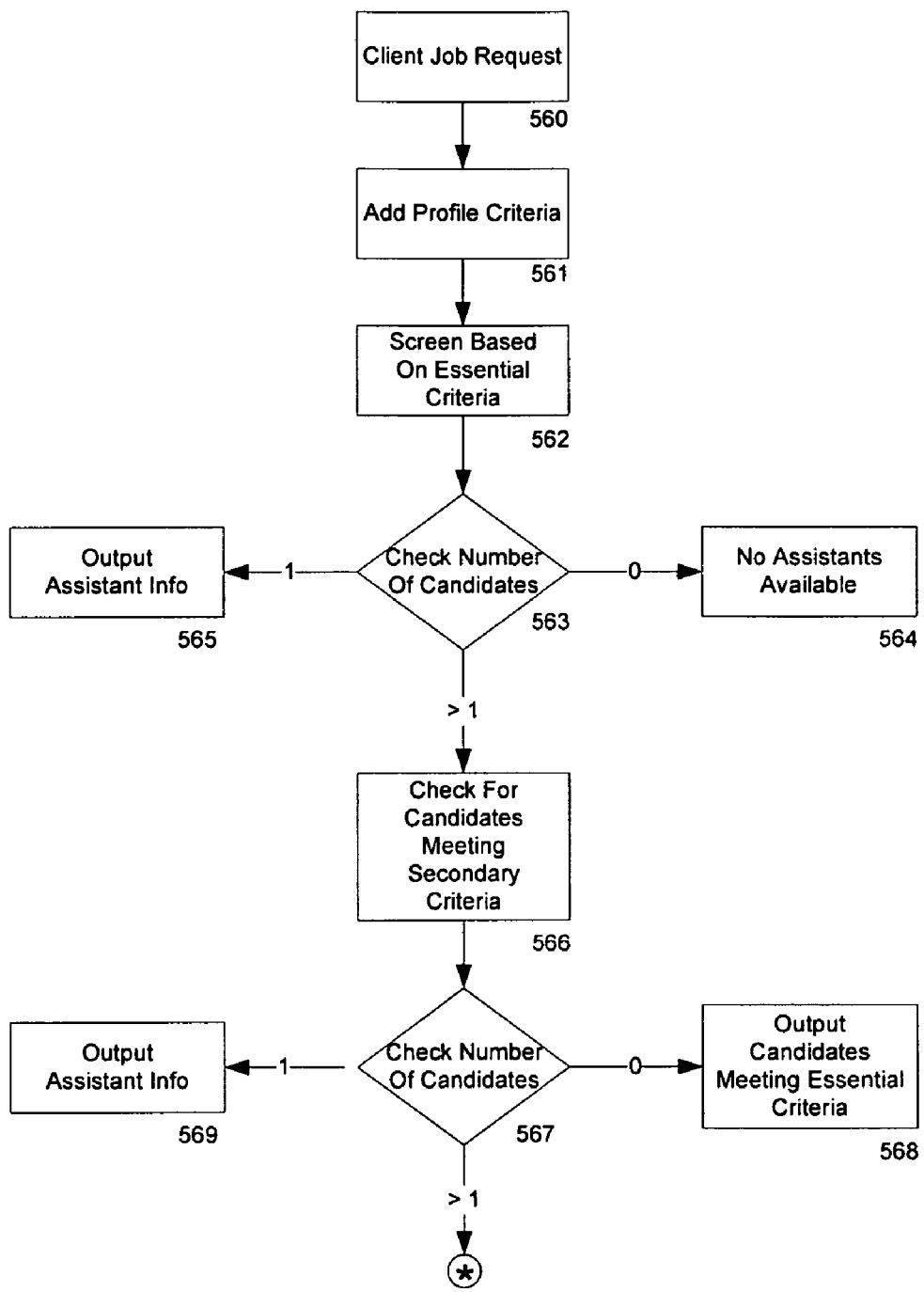
FIGS. 5A, 5B and 5C illustrate an exemplary logic flow diagram of the locate process.
Figure 5B:
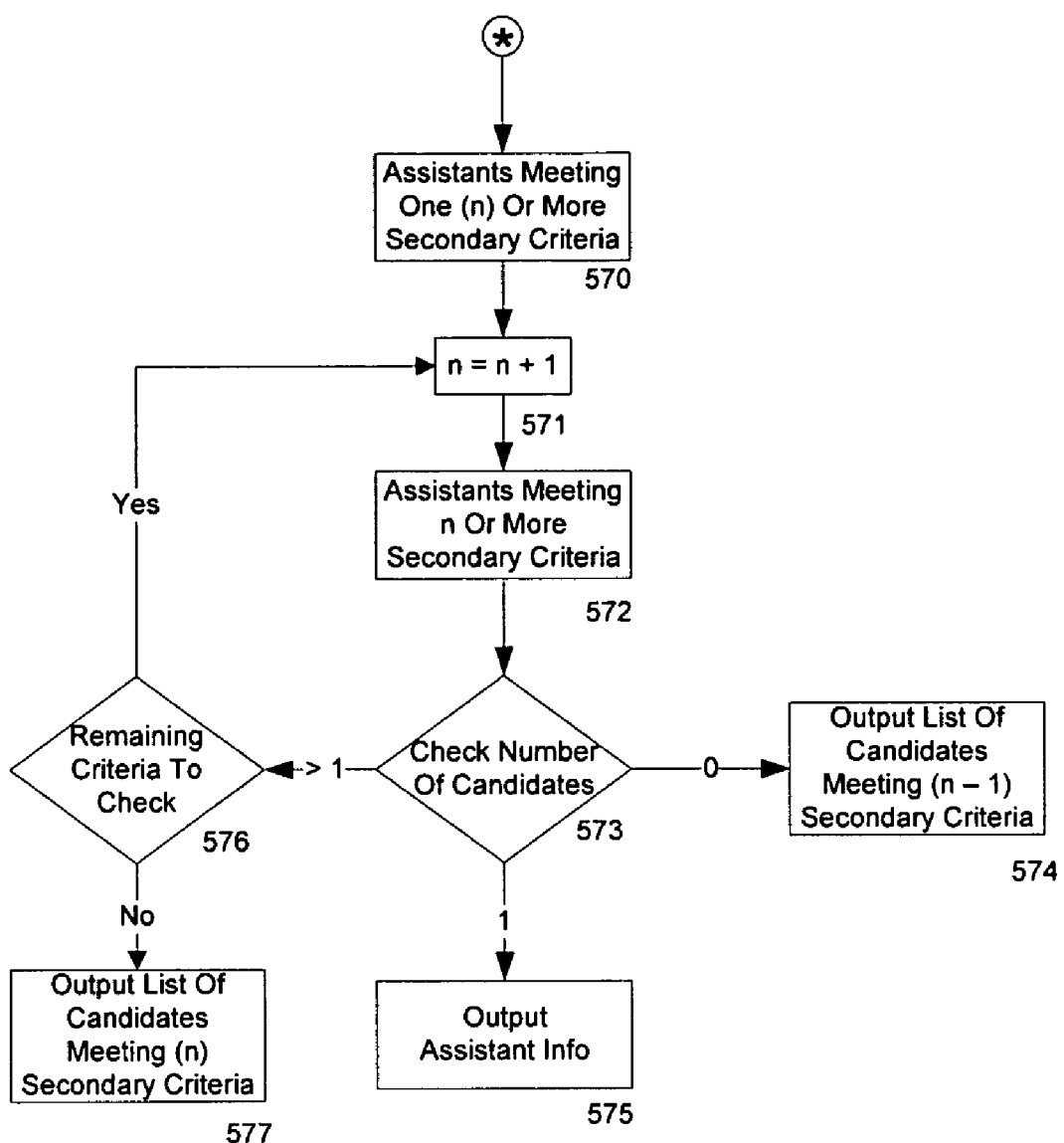
Figure 5C:
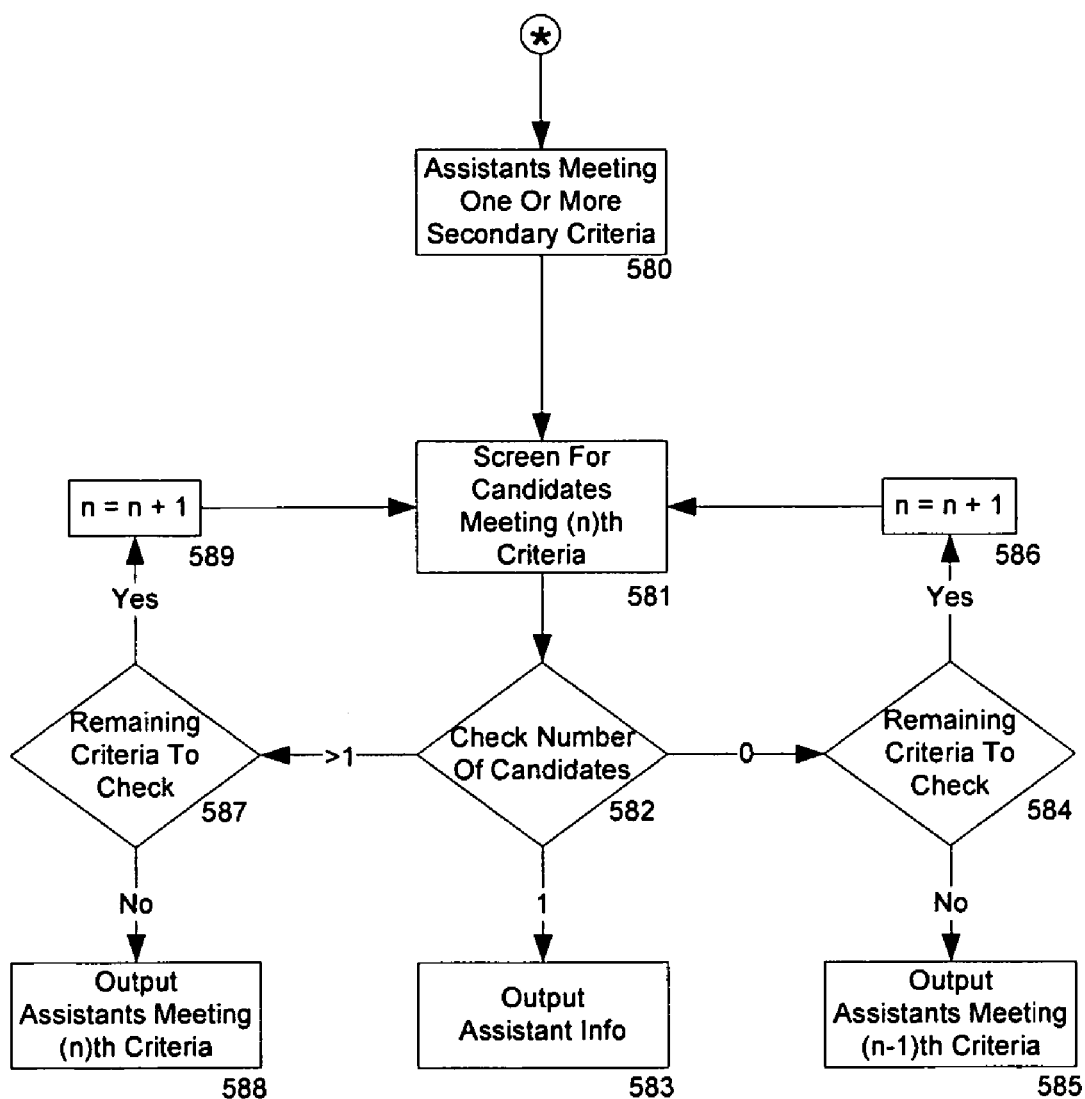

FIGS. 5A, 5B and 5C illustrate an exemplary logic flow diagram for the locate process. The input for the locate process is the client job request 560, which provides some of the criteria for the job search. Additional criteria for the job search can be derived by adding information from the household profile 561, such as the household's location or other static preferences that would apply to all job requests.

Next an iterative screening search of the assistant database is performed. The database queries discussed can be performed via any method know in the art or later developed. The iterative screening search begins with an essential criteria screening search 562 of the assistant database to obtain a pool of potential candidates. The essential criteria screening search 562 uses search criteria that are essential to the fulfillment of the household's request, such as, availability and/or location. Availability and location are somewhat fundamental criteria and provide an easy basis for narrowing down the list of assistants, i.e., at the very least there must be people available at the requested time in the requested place.

The household can also optionally be allowed to indicate deal breaking criteria. For example, if a household is requesting an assistant with ideally three skill sets, e.g., cooking, fluent in English and ironing, the household might assign fluent in English as a required skill. Any such identified vital criteria would be added to the essential criteria screening search 562.

The results of the essential criteria screening search 562 are passed to a decision block 563 where a check is made to determine if any available assistants were located. Thus, if available assistant list is empty a "no assistants available" error 564 is generated. This information could either be communicated to the household or the search could be placed on hold to be re-run at a later date when the availability information may have changed. If the available assistant list has only one entry, the information for that assistant is output 565 to the booking and notification processes described above. If the list has more than one entry, the process continues on to the secondary criteria screening.

A search of the remaining candidates is performed to determine which candidates meet one or more of the secondary criteria 566. The results of this screening are passed to a decision block 567. If none of the assistants meet any of the secondary criteria, the list of the assistants meeting the essential criteria are output 568 to the booking and notification processes. If only one assistant meets any of the secondary criteria, the information for that assistant is output 569 to the booking and notification processes. If multiple assistants meet one or more of the secondary criteria further refinement of the search can be performed as follows.

In one exemplary embodiment, the list of all assistants meeting one or more secondary criteria can then be presented to the household for final assistant selection. This approach works particularly well when the secondary criteria are not ordered in terms of importance. In other words, if the household lists a number of secondary criteria without indicating that some of those criteria are more preferred than others, it might be best to give the household a chart showing all the assistants that meet their essential criteria plus one or more of their secondary criteria. The household can then review the chart to see how the assistants meet their secondary criteria and choose whomever they feel is the best match.

This approach could be refined, as shown in FIG. 5B, by iterating over the list of assistants meeting one or more criteria to find the assistants meeting the most categories of secondary criteria. This approach begins with the list of candidates meeting one or more of the household's secondary criteria 570. To determine if any of the candidates meet more than one criteria the value n, which begins at one, is incremented by adding one to itself 571. The list of candidates 570 is screened for candidates that meet n criteria 572, i.e. 2 during the first iteration of the process. The number of candidates remaining after this screening is checked 573. If no candidates remain, the list of assistants meeting n−1 criteria is output 574. If only one candidate remains on the list, that assistant's information is output 575. If more than one candidate remains, a determination is made to decide whether there are still more secondary household criteria to check 576. If there are not, the list of assistants meeting n criteria is output 577. If there are secondary criteria remaining, the process increments n again 571 and the filtering process continues.

The process as described above will result in a list of the assistants that meet the highest number of the household's criteria. In other words, if ten assistants meet any four of the household's criteria, but none of the assistants meet five of the criteria, this locate process will identify those ten assistants. This procedure, however, does not value any of the secondary criteria more than the rest. Accordingly, if some of the household's secondary criteria are more important than others a different algorithm might be advisable.

FIG. 5C discloses an exemplary algorithm for screening candidates such that they are identified according to the importance of the secondary criteria. This algorithm requires the secondary criteria to ordered as to their importance, with the most important criteria listed first, the second most important second and so on. This ordering can either be identified by the household, the In-house Assistant Service or it can inherently be programmed into the system.

The process begins with a list of candidates meeting one or more of the secondary criteria 580. This list is screened for candidates matching the (n)th most important secondary criteria 581, i.e., the first most important criteria in the first iteration of the process, etc. The results derived from the screening are checked to determine the number of matching candidates 582. If only one candidate remains after the screening, that assistant's information is output 583. If no candidates remain after the screening, a determination is made to discover whether there are other criteria to check 584. If not, the assistants found after search for matches for the (n−1)th criteria are output 585. If other criteria remain to be searched, the value of n is incremented 586. The candidates remaining after the previous screening are now screened again at 581 to determine if any of those candidates match the new (n)th criteria and the iterative process continues. If multiple candidates are found to meet the (n)th criteria at decision 582, a determination 587 is made to find whether there are any criteria remaining to be searched. If no criteria remain, a list of assistants meeting the (n)th criteria is output 588. If other criteria remain to be searched, the value of n is incremented 589. The candidates remaining after the previous screening are now screened again at 581 to determine if any of those candidates match the new (n)th criteria and the iterative process continues.

Alternatively, the search systems disclosed in FIGS. 5B and 5C could be combined. For example, a hybrid approach might use the 5B approach to narrow the field of candidates to Assistants meeting at least three secondary criteria and then use the 5C approach test for secondary criteria in a preferred order.

Another approach might reuse an essential criteria as secondary criteria. For example, it might be advisable to use location as an essential criteria to exclude assistants outside the household's area. Then after narrowing down assistants based upon a number of secondary criteria it might be beneficial to reuse the location data to offer the job to the closest available assistant.

Figure 6:
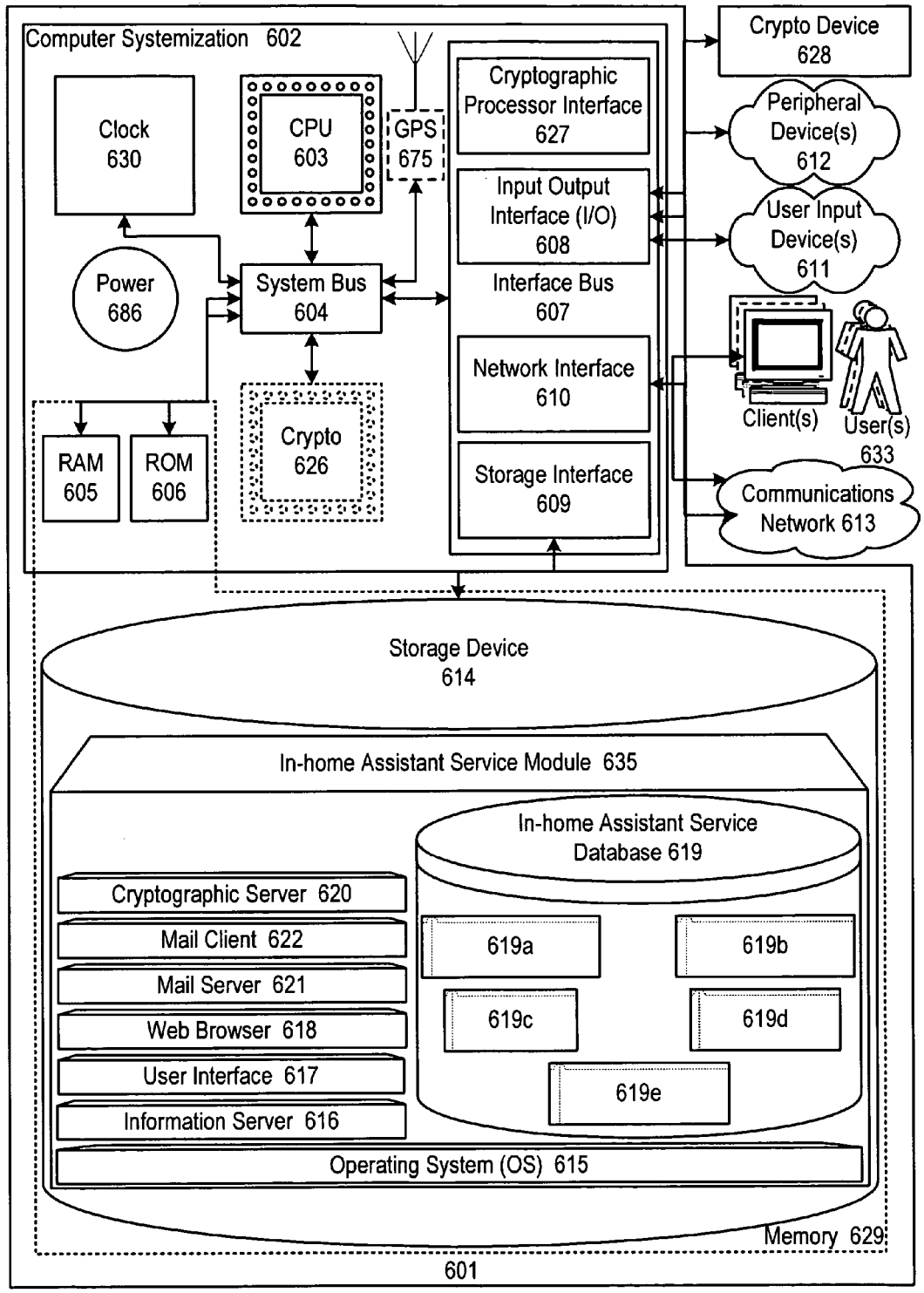
FIG. 6 of the present disclosure illustrates inventive aspects of a In-home Assistant Service controller in a block diagram.

FIG. 6 of the present disclosure illustrates inventive aspects of an In-home assistant service controller 601 in a block diagram. In this embodiment, the In-home assistant service controller 601 may serve to process, store, search, serve, identify, instruct, generate, match, and/or update assistant profiles, client profiles, job requests and/or other related data. It should be noted that the client networked device and the assistant networked device may be comprised similarly to the In-home Assistant Service 601.

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. A computer operating system, which, typically, is software executed by CPU on a computer, enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through database software. Information technology systems provide interfaces that allow users to access and operate various system components.

In one embodiment, the In-home Assistant Service controller 601 may be connected to and/or communicate with entities such as, but not limited to: one or more users from user input devices 611; peripheral devices 612; a cryptographic processor device 628; and/or a communications network 613.

Networks are commonly thought to comprise the interconnection and interoperation of clients, servers, and intermediary nodes in a graph topology. It should be noted that the term "server" as used throughout this disclosure refers generally to a computer, other device, software, or combination thereof that processes and responds to the requests of remote users across a communications network. Servers serve their information to requesting "clients." The term "client" as used herein refers generally to a computer, other device, software, or combination thereof that is capable of processing and making requests and obtaining and processing any responses from servers across a communications network. A computer, other device, software, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

A the In-home Assistant Service controller 601 may be based on common computer systems that may comprise, but are not limited to, components such as: a computer systemization 602 connected to memory 629.

Computer Systemization

A computer systemization 602 may comprise a clock 630, central processing unit (CPU) 603, a read only memory (ROM) 606, a random access memory (RAM) 605, and/or an interface bus 607, and most frequently, although not necessarily, are all interconnected and/or communicating through a system bus 604. Optionally, the computer systemization may be connected to an internal power source 686. Optionally, a cryptographic processor 626 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program modules for executing user and/or system-generated requests. The CPU may be a microprocessor such as AMD's Athlon, Duron and/or Opteron; IBM and/or Motorola's PowerPC; Intel's Celeron, Itanium, Pentium, Xeon, and/or XScale; and/or the like processor(s). The CPU interacts with memory through signal passing through conductive conduits to execute stored program code according to conventional data processing techniques. Such signal passing facilitates communication within the In-home Assistant Service controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 686 may be of any standard form for powering small electronic circuit board devices such as the following power cells: alkaline, lithium hydride, lithium ion, nickel cadmium, solar cells, and/or the like. Other types of AC or DC power sources may be used as well. In the case of solar cells, in one embodiment, the case provides an aperture through which the solar cell may capture photonic energy. The power cell 686 is connected to at least one of the interconnected subsequent components of the In-home Assistant Service thereby providing an electric current to all subsequent components. In one example, the power source 686 is connected to the system bus component 604. In an alternative embodiment, an outside power source 686 is provided through a connection across the I/O 608 interface. For example, a USB and/or IEEE 1394 connection carries both data and power across the connection and is therefore a suitable source of power.

Interface Adapters

Interface bus(ses) 607 may accept, connect, and/or communicate to a number of interface adapters, conventionally although not necessarily in the form of adapter cards, such as but not limited to: input output interfaces (I/O) 608, storage interfaces 609, network interfaces 610, and/or the like. Optionally, cryptographic processor interfaces 627 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 609 may accept, communicate, and/or connect to a number of storage devices such as, but not limited to: storage devices 614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 610 may accept, communicate, and/or connect to a communications network 613. Through a communications network 613, the In-home Assistant Service controller is accessible through remote clients 633b (e.g., computers with web browsers) by users 633. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMN); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 610 may be used to engage with various communications network types 613. For example, multiple network interfaces may be employed to allow for the communication over broadcast, multicast, and/or unicast networks.

Input Output interfaces (I/O) 608 may accept, communicate, and/or connect to user input devices 611, peripheral devices 612, cryptographic processor devices 628, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set 145, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 611 may be card readers, dongles, finger print readers, gloves, graphics tablets, joysticks, keyboards, mouse (mice), remote controls, retina readers, trackballs, trackpads, and/or the like.

Peripheral devices 612 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the In-home Assistant Service controller may be embodied as an embedded, dedicated, and/or monitor-less (i.e., headless) device, wherein access would be provided over a network interface connection.

Cryptographic units such as, but not limited to, microcontrollers, processors 626, interfaces 627, and/or devices 628 may be attached, and/or communicate with the In-home Assistant Service controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 629. However, memory is a fungible technology and resource, thus, any number of memory embodiments may be employed in lieu of or in concert with one another. It is to be understood that a the In-home Assistant Service controller and/or a computer systemization may employ various forms of memory 629. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 629 will include ROM 606, RAM 605, and a storage device 614. A storage device 614 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); and/or other devices of the like. Thus, a computer systemization generally requires and makes use of memory.

Module Collection

The memory 629 may contain a collection of program and/or database modules and/or data such as, but not limited to: operating system module(s) 615 (operating system); information server module(s) 616 (information server); user interface module(s) 617 (user interface); Web browser module(s) 618 (Web browser); database(s) 619; cryptographic server module(s) 620 (cryptographic server); the In-home Assistant Service module(s) 635; and/or the like (i.e., collectively a module collection). These modules may be stored and accessed from the storage devices and/or from storage devices accessible through an interface bus. Although non-conventional software modules such as those in the module collection, typically, are stored in a local storage device 614, they may also be loaded and/or stored in memory such as: peripheral devices, RAM, remote storage facilities through a communications network, ROM, various forms of memory, and/or the like.

Operating System

The operating system module 615 is executable program code facilitating the operation of the In-home Assistant Service controller. Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh OS, Microsoft DOS, Palm OS, Windows 2000/2003/3.1/95/98/CE/Millenium/NT/XP (Server), and/or the like. An operating system may communicate to and/or with other modules in a module collection, including itself, and/or the like. Most frequently, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. The operating system may provide communications protocols that allow the In-home Assistant Service controller to communicate with other entities through a communications network 613. Various communication protocols may be used by the In-home Assistant Service controller as a subcarrier transport mechanism for interaction, such as, but not limited to: multicast, TCP/IP, UDP, unicast, and/or the like.

Information Server

An information server module 616 is stored program code that is executed by the CPU. The information server may be a conventional Internet information server such as, but not limited to Apache Software Foundation's Apache, Microsoft's Internet Information Server, and/or the information server may allow for the execution of program modules through facilities such as Active Server Page (ASP), ActiveX, (ANSI) (Objective-) C (++), C#, Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program modules. After a Domain Name System (DNS) resolution portion of an HTTP request is resolved to a particular information server, the information server resolves requests for information at specified locations on the In-home Assistant Service controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other modules in a module collection, including itself, and/or facilities of the like. Most frequently, the information server communicates with the In-home Assistant Service database 619, operating systems, other program modules, user interfaces, Web browsers, and/or the like.

Access to the In-home Assistant Service database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the In-home Assistant Service. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the In-home Assistant Service as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program module, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, Microsoft's Windows XP, or Unix's X-Windows provide a baseline and means of accessing and displaying information graphically to users.

A user interface module 617 is stored program code that is executed by the CPU. The user interface may be a conventional graphic user interface as provided by, with, and/or atop operating systems and/or operating environments such as Apple Macintosh OS, e.g., Aqua, Microsoft Windows (NT/XP), Unix X Windows (KDE, Gnome, and/or the like), mythTV, and/or the like. The user interface may allow for the display, execution, interaction, manipulation, and/or operation of program modules and/or system facilities through textual and/or graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

Web Browser

A Web browser module 618 is stored program code that is executed by the CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program modules through facilities such as Java, JavaScript, ActiveX, and/or the like. Web browsers and like information access tools may be integrated into PDAs, cellular telephones, and/or other mobile devices. A Web browser may communicate to and/or with other modules in a module collection, including itself, and/or facilities of the like. Most frequently, the Web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the In-home Assistant Service enabled nodes. The combined application may be nugatory on systems employing standard Web browsers.

Cryptographic Server

A cryptographic server module 620 is stored program code that is executed by the CPU 603, cryptographic processor 626, cryptographic processor interface 627, cryptographic processor device 628, and/or the like. Cryptographic processor interfaces will allow for expedition of encryption and/or decryption requests by the cryptographic module; however, the cryptographic module, alternatively, may run on a conventional CPU. The cryptographic module allows for the encryption and/or decryption of provided data. The cryptographic module allows for both symmetric and asymmetric (e.g., Pretty Good Protection (PGP)) encryption and/or decryption. The cryptographic module may employ cryptographic techniques such as, but not limited to: digital certificates (e.g., X.509 authentication framework), digital signatures, dual signatures, enveloping, password access protection, public key management, and/or the like. The cryptographic module will facilitate numerous (encryption and/or decryption) security protocols such as, but not limited to:

checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the In-home Assistant Service may encrypt all incoming and/or outgoing communications and may serve as node within a virtual private network (VPN) with a wider communications network. The cryptographic module facilitates the process of "security authorization" whereby access to a resource is inhibited by a security protocol wherein the cryptographic module effects authorized access to the secured resource. In addition, the cryptographic module may provide unique identifiers of content, e.g., employing and MD5 hash to obtain a unique signature for an digital audio file. A cryptographic module may communicate to and/or with other modules in a module collection, including itself, and/or facilities of the like. The cryptographic module supports encryption schemes allowing for the secure transmission of information across a communications network to enable the In-home Assistant Service module to engage in secure transactions if so desired. The cryptographic module facilitates the secure accessing of resources on the In-home Assistant Service and facilitates the access of secured resources on remote systems; i.e., it may act as a client and/or server of secured resources. Most frequently, the cryptographic module communicates with information servers, operating systems, other program modules, and/or the like. The cryptographic module may contain, communicate, generate, obtain, and/or provide program module, system, user, and/or data communications, requests, and/or responses.

The In-Home Assistant Service Database

The In-home Assistant Service database module 619 may be embodied in a database and its stored data. The database is stored program code, which is executed by the CPU; the stored program code portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the In-home Assistant Service database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the In-home Assistant Service database is implemented as a data-structure, the use of the In-home Assistant Service database 619 may be integrated into another module such as the In-home Assistant Service module 635. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database module 619 includes several tables 619*a-e*. An assistant table 619*a* includes fields such as, but not limited to: assistant name, assistant address, assistant skills, assistant skill levels and/or the like. A household table 619*b* includes fields such as, but not limited to: name, address, billing information.

In one embodiment, user programs may contain various user interface primitives, which may serve to update the In-home Assistant Service. Also, various accounts may require custom database tables depending upon the environments and the types of clients the In-home Assistant Service may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database modules 619*a-e*. The In-home Assistant Service may be configured to keep track of various settings, inputs, and parameters via database controllers.

The In-home Assistant Service database may communicate to and/or with other modules in a module collection, including itself, and/or facilities of the like. Most frequently, the In-home Assistant Service database communicates with a the In-home Assistant Service module, other program modules, and/or the like. The database may contain, retain, and provide information regarding other nodes and data.

The In-Home Assistant Service

The In-home Assistant Service module 635 is stored program code that is executed by the CPU. The In-home Assistant Service affects accessing, obtaining and the provision of information, services, transactions, and/or the like across various communications networks.

The In-home Assistant Service module enabling access of information between nodes may be developed by employing standard development tools such as, but not limited to: (ANSI) (Objective-) C (++), Apache modules, binary executables, database adapters, Java, JavaScript, mapping tools, procedural and object oriented development tools, PERL, Python, shell scripts, SQL commands, web application server extensions, WebObjects, and/or the like. In one embodiment, the In-home Assistant Service server employs a cryptographic server to encrypt and decrypt communications. The In-home Assistant Service module may communicate to and/or with other modules in a module collection, including itself, and/or facilities of the like. Most frequently, the In-home Assistant Service module communicates with a the In-home Assistant Service database, operating systems, other program modules, and/or the like. The In-home Assistant Service may contain, communicate, generate, obtain, and/or provide program module, system, user, and/or data communications, requests, and/or responses.

Distributed In-Home Assistant Service

The structure and/or operation of any of the In-home Assistant Service controller components may be combined, consolidated, and/or distributed in any number of ways to facilitate development and/or deployment. Similarly, the module collection may be combined in any number of ways to facilitate deployment and/or development. To accomplish this, one may integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load-balancing and/or data-processing techniques. Furthermore, single instances may also be distributed across multiple controllers and/or storage devices; e.g., databases. All program module instances and controllers working in concert may do so through standard data processing communication techniques.

The configuration of the In-home Assistant Service controller will depend on the context of system deployment. Factors such as, but not limited to, the budget, capacity, location, and/or use of the underlying hardware resources may affect deployment requirements and configuration. Regardless of if the configuration results in more consolidated and/or integrated program modules, results in a more distributed series of program modules, and/or results in some combination between a consolidated and distributed configuration, data may be communicated, obtained, and/or provided. Instances of modules consolidated into a common code base from the program module collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If module collection components are discrete, separate, and/or external to one another, then communicating, obtaining, and/or providing data with and/or to other module components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), process pipes, shared files, and/or the like. Messages sent between discrete module components for inter-application communication or within memory spaces of a singular module for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between modules. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A processor-implemented method for providing households with part-time service assistants comprising:

collecting and storing a plurality of assistant profiles, the plurality of assistant profiles each comprising a location; a time window of availability; skill sets including two or more household service skills, a rated ability level for each of the two or more household service skills; and a billable rate for each of two or more household service skills;

receiving via the processor a job request from a household, the job request comprising:

essential criteria including a location, a time window for performing the job request, and one or more skill sets that are designated as essential; and secondary criteria including skill sets that are desired for the job request including two or more household service skills, a rated ability level for the two or more household service skills and a billable rate for the two or more household service skills, wherein each of the secondary criteria are designated a level of importance to the household;

screening via the processor the stored plurality of assistant profiles based on essential criteria, such that assistant profiles not satisfying the essential criteria are excluded from an essential criteria screening result;

determining whether one or more assistant profiles of the plurality of assistant profiles are included in the essential criteria screening result and when it is determined the essential criteria screening result contains zero assistant profiles placing the job request on hold, when it is determined that the essential criteria screening result contains only one of the assistant profile, notifying the chosen assistant about the job request; and when it is determined that more than one of the assistant profiles is included in the essential criteria screening result, further screening the each of the one or more assistant profiles based on one or more secondary criteria;

screening the stored plurality of assistant profiles based on the secondary criteria, wherein the screening is based on the rated ability level for the two or more household skills and the designated level of importance to the household;

determining which of the plurality of assistant profiles meet the largest number of secondary criteria and selecting a chosen assistant from the plurality of assistant profiles;

notifying the chosen assistant about the job request;

receiving confirmation from the chosen assistant;

notifying the household;

billing the household for performance of the requested job; and receiving a perceived ability level pertaining to the chosen assistant from the household and adjusting the rated ability level in the chosen assistant's profile based on the perceived ability level.

2. A processor-implemented method for providing households with part-time service assistants comprising:

collecting and storing a plurality of assistant profiles, the plurality of assistant profiles each comprising a location; a time window of availability; skill sets including two or more household service skills, a rated ability level for each of the two or more household service skills; and a billable rate for each of two or more household service skills;

receiving via the processor a job request from a household, the job request comprising essential criteria including a location, a time window for performing the job request, and one or more skill sets that are designated as essential; and secondary criteria including skill sets that are desired for the job request including two or more household service skills, a rated ability for the two or more household service skills and a billable rate for the two or more household service skills; wherein each of the secondary criteria are designated a level of importance to the household;

screening via the processor the stored plurality of assistant profiles based on the essential criteria, such that assistant profiles not satisfying the essential criteria are excluded from an essential criteria screening result;

iteratively screening via the processor the essential criteria screening result for the plurality of assistant profiles that match one or more most important secondary criteria, such that assistant profiles not satisfying the one or more most important secondary criteria are excluded from a secondary criteria screening result; and selecting via the processor a chosen assistant profile from the secondary criteria screening result by incrementally screening each of the secondary criteria, based the designated level of importance to the household, until the chosen assistant profile is identified.

3. The method of claim 2 wherein the essential criteria comprises a location and a specific time including a date and designed hours to perform the job request.

4. The method of claim 2 wherein the secondary criteria comprises a distance from the location, a requested ability level, and a requested specialization for the one or more household service skills.

5. The method of claim 2 wherein a location is both one of the essential criteria and one of the secondary criteria.

6. The method of claim 2 wherein the secondary criteria screening comprises determining that at least two assistant profiles matches both the essential criteria and secondary criteria; and communicating a list of potential part-time service assistants to the household.

7. The method of claim 2 wherein prior to the iterative screen via the processor of the essential criteria screening result for the plurality of assistant profiles that match one or more most important secondary criteria, determine whether one or more assistant profiles of the plurality of assistant profiles are included in the essential criteria screening result and when it is determined the essential criteria screening result contains zero assistant profiles place the job request on hold, when it is determined that the essential criteria screening result contains only one of the assistant profile, notify the chosen assistant about the job request; and when it is determined that more than one of the assistant profiles is included in the essential criteria screening result, further screen the each of the one or more assistant profiles based on one or more secondary criteria.

8. The method of claim 2 further comprising receiving a perceived performance pertaining to the selected assistant from the household and adjusting the rated ability level in the selected assistant's profile based on the perceived performance.

9. The method of claim 2 further comprising billing the household.

10. The method of claim 2 wherein a fluency level in one or more languages is designated as an essential skill.

11. The method of claim 2 wherein the selecting step further comprises transmitting information identifying the job described in the job request to a plurality of assistants identified in the assistant profiles present in the essential screening, receiving a communication from the plurality of assistants indicating their billable rate for performing the job, and selecting the assistant of the plurality of assistants with the lowest billable rate as the chosen assistant.

12. A computer readable medium storing processor executable instructions for providing households with service assistants, when executed by a processor, instructs a computer to:

collect and store a plurality of assistant profiles, the plurality of assistant profiles each comprising a location; a time window of availability; skill sets including two or more household service skills, a rated ability level for each of the two or more household service skills; and a billable rate for each of two or more household service skills;

receive via the processor a job request from a household, the job request comprising:

essential criteria including a location, a time window for performing the job request, and one or more skill sets that are designated as essential; and secondary criteria including skill sets that are desired for the job request including two or more household service skills, a rated ability level for the two or more household service skills and a billable rate for the two or more household service skills, wherein each secondary criteria is designated a level of importance to the household;

screen via the processor the stored plurality of assistant profiles based on essential criteria, such that assistant profiles not satisfying the essential criteria are excluded from an essential criteria screening result;

iteratively screen via the processor the essential criteria screening result for the plurality of assistant profiles that match one or more most important secondary criteria, such that assistant profiles not satisfying the one or more most important secondary criteria are excluded from a secondary criteria screening result; and select via the processor a chosen assistant profile from the secondary criteria screening result by incrementally screening each of the secondary criteria, based the designated level of importance to the household, until the chosen assistant profile is identified.

13. The computer readable medium of claim 12 wherein the essential criteria comprises a location and a specific time including a date and designed hours to perform the job request.

14. The computer readable medium of claim 12 wherein the secondary criteria comprises a distance from the location, a requested ability level, and a requested specialization for the one or more household service skills.

15. The computer readable medium of claim 12 wherein a location is both one of the essential criteria and one of the secondary criteria.

16. The computer readable medium of claim 12 wherein the secondary criteria screening comprises determining that at least two assistant profiles matches both the essential criteria and secondary criteria; and communicating a list of potential part-time service assistants to the household.

17. The computer readable medium of claim 12 wherein prior to the iterative screen via the processor of the essential criteria screening result for the plurality of assistant profiles that match one or more most important secondary criteria, determine whether one or more assistant profiles of the plurality of assistant profiles are included in the essential criteria screening result and when it is determined the essential criteria screening result contains zero assistant profiles place the job request on hold, when it is determined that the essential criteria screening result contains only one of the assistant profile, notify the chosen assistant about the job request; and when it is determined that more than one of the assistant profiles is included in the essential criteria screening result, further screen the each of the one or more assistant profiles based on one or more secondary criteria.

18. The computer readable medium of claim 12 further comprising instructions to receive a perceived ability level pertaining to the selected assistant from the household and adjusting the rated ability level in the selected assistant's profile based on the perceived ability level.

19. The computer readable medium of claim 12 further comprising instructions to bill the household.

20. The computer readable medium of claim 12 wherein a fluency level in one or more languages is designated as an essential skill.

21. The computer readable medium of claim 12 further comprising instructions to transmit information identifying the job described in the job request to a plurality of assistants identified in the assistant profiles present in the essential screening, and instructions to receive a communication from the plurality of assistants indicating their billable rate for performing the job, and selecting the assistant of the plurality of assistants with the lowest billable rate as the chosen assistant.

22. An apparatus for providing households with service assistants comprising:
a processor;
a memory connected to and in communication with the processor and containing processor-executable instructions;
a network interface connected to the processor to provide network access to the processor;
wherein the processor executes instructions contained in the memory and the instructions instruct the apparatus to:
collect and store a plurality of assistant profiles, the plurality of assistant profiles each comprising a location; a time window of availability; skill sets including two or more household service skills, a rated ability level for each of the two or more household service skills; and a billable rate for each of two or more household service skills;
receive via the processor a job request from a household, the job request comprising:
essential criteria including a location, a time window for performing the job request, and one or more skill sets that are designated as essential; and secondary criteria including skill sets that are desired for the job request including two or more household service skills, a rated ability level for the two or more household service skills and a billable rate for the two or more household service skills, wherein each secondary criteria is designated a level of importance to the household;
screen via the processor the stored plurality of assistant profiles based on essential criteria, such that assistant profiles not satisfying the essential criteria are excluded from an essential criteria screening result;
iteratively screen via the processor the essential criteria screening result for the plurality of assistant profiles that match one or more most important secondary criteria, such that assistant profiles not satisfying the one or more most important secondary criteria are excluded from a secondary criteria screening result; and
select via the processor a chosen assistant profile from the secondary criteria screening result by incrementally screening each of the secondary criteria, based the designated level of importance to the household, until the chosen assistant profile is identified.

23. The apparatus of claim 22 wherein the essential criteria comprises a location and a specific time including a date and designed hours to perform the job request.

24. The apparatus of claim 22 wherein the secondary criteria comprises a distance from the location, a requested ability level, and a requested specialization for the one or more household service skills.

25. The apparatus of claim 22 wherein a location is both one of the essential criteria and one of the secondary criteria.

26. The apparatus of claim 22 wherein the processor-executable instruction for screening based on secondary criteria comprises determining that at least two assistant profiles matches both the essential criteria and secondary criteria; and communicating a list of potential part-time service assistants to the household.

27. The apparatus of claim 22 wherein prior to the iterative screen via the processor of the essential criteria screening result for the plurality of assistant profiles that match one or more most important secondary criteria, determine whether one or more assistant profiles of the plurality of assistant profiles are included in the essential criteria screening result and when it is determined the essential criteria screening result contains zero assistant profiles place the job request on hold, when it is determined that the essential criteria screening result contains only one of the assistant profile, notify the chosen assistant about the job request; and when it is determined that more than one of the assistant profiles is included in the essential criteria screening result, further screen the each of the one or more assistant profiles based on one or more secondary criteria.

28. The apparatus of claim 22 further comprising a processor-executable instruction for receiving a perceived ability level pertaining to the selected assistant from the household and adjusting the rated ability level in the selected assistant's profile based on the perceived ability level.

29. The apparatus of claim 22 further comprising a processor-executable instruction for billing the household.

30. The apparatus of claim 22 wherein a fluency level in one or more languages is designated as an essential skill.

31. The apparatus of claim 22 further comprising instructions to transmit information identifying the job described in the job request to a plurality of assistants identified in the assistant profiles present in the essential screening and instructions to receive a communication from the plurality of assistants indicating their billable rate for performing the job, and selecting the assistant of the plurality of assistants with the lowest billable rate as the chosen assistant.

* * * * *